Jan. 18, 1949.  G. E. CANHAM  2,459,412
SELF-STARTING IMPULSE TYPE ELECTRIC MOTOR
Filed Oct. 28, 1947
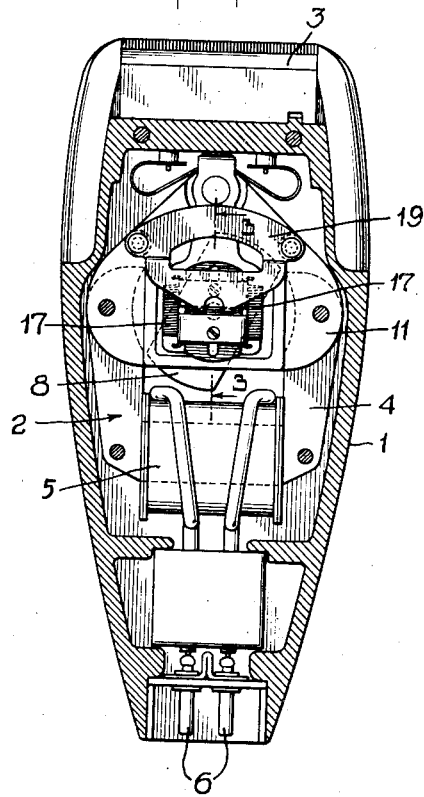
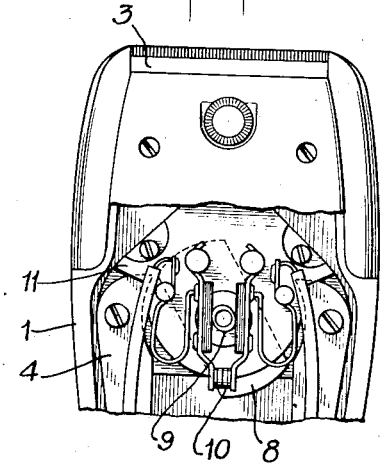
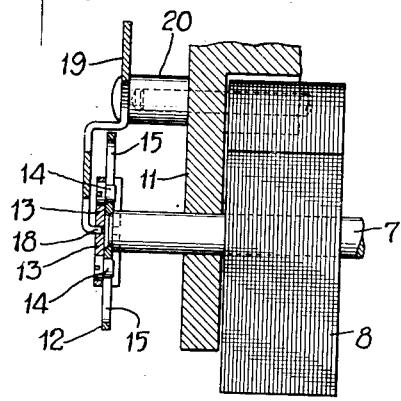
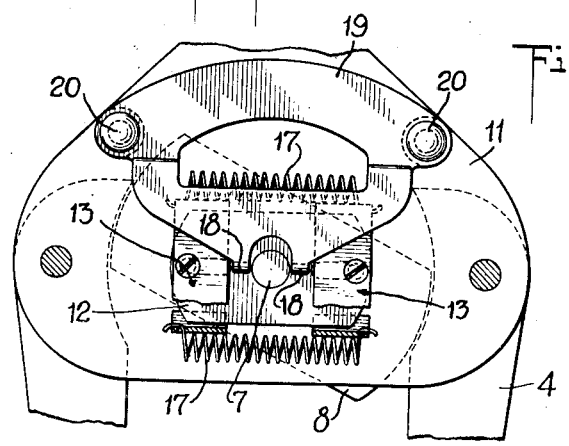
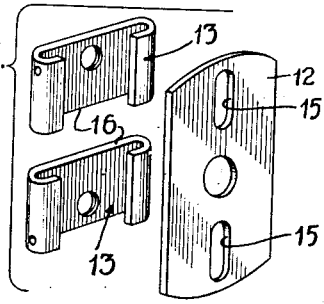
INVENTOR
George E. Canham
BY
Burgess Ryan & Hicks
ATTORNEYS Patented Jan. 18, 1949

2,459,412

UNITED STATES PATENT OFFICE 2,459,412

SELF-STARTING IMPULSE TYPE ELECTRIC MOTOR

George E. Canham, West Orange, N. J., assignor to Schick Incorporated, Stamford, Conn., a corporation of Delaware Application October 28, 1947, Serial No. 782,507

6 Claims. (Cl. 172—36)

This invention relates to what are usually termed impulse type motors, that is to say, small electric motors of the kind utilizing an unwound armature which rotates in a field which is intermittently excited under the control of make and break contact mechanism operated from the armature shaft. Motors of this type are commonly used to operate electric shavers and it is in such application that the motor of the present invention is herein described and illustrated.

As is well known, these impulse type electric motors are not consistently self-starting. On occasion, they do start automatically as soon as they are connected to the current supply but this is quite accidental, and occurs only when the armature happens to have come to rest in its so called self-starting position; that is to say, the position in which the field circuit is completed through the make and break mechanism and in which the armature is appropriately located in relation to the field poles to start rotating as soon as current is applied to the field circuit.

The fact that such motors are timed to have a self-starting position has been made use of to facilitate the starting of electric shavers, by the provision of an index on the shaver case adjacent the usual starting wheel and an index mark on the starting wheel itself, the latter mark so located that, when brought into registration with the index on the case, the armature and its shaft are in the self-starting position. In the result, the motor will start automatically as soon as current is applied. However, this arrangement requires the manual manipulation of the starting wheel to preset it before applying the current.

The object of the present invention is to provide for the automatic self-starting of motors of the above type, by the provision of means for insuring that at the conclusion of each period of operation the motor is brought to rest in its self-starting position, so that ordinarily it will start of its own accord, without any manual manipulation, when the current is next applied to it. In the accompanying drawings and in the following specification the details of a preferred form of the invention are shown and described as applied to the motor of a well known form of electric shaver.

In the drawings, Fig. 1 is a longitudinal section of a shaver incorporating the preferred form of motor; Fig. 2 is a broken-out partially sectioned view of the opposite side of the motor from that shown in Fig. 1; Fig. 3 is an enlarged sectional view on the line 3—3 of Fig. 1; Fig. 4 is an enlarged broken-out view of a portion of the motor showing the parts in a different position and Fig. 5 is an exploded view of certain of the components.

Referring to Fig. 1, the essentials of the illustrated shaver will be recognized as including a case 1, housing a motor generally designated 2 and a shearing head 3 which embodies the usual inner cutter (not shown) adapted to be oscillated through suitable drive mechanism from the motor 2.

The motor consists of a more or less U-shaped field 4 which carries a field coil 5 adapted to be energized when coupled to the current supply by a suitable cord having an end plug for attachment to the prongs 6. Mounted on a shaft 7 (Figs. 4 and 7) for rotation between the field poles is an armature 8 and on one end of the armature shaft (Fig. 2) is a cam 9 which serves to make and break the field circuit at contacts 10. The armature shaft 7 is journaled in suitable bearings in an insulating bridge piece 11, which likewise carries the make and break contact mechanism. The foregoing elements and their mode of operation are well understood and require no detailed description.

According to the present invention the motor is provided with what is essentially a centrifugal brake, operatively associated with the armature shaft and having spring means biasing it to arrest the shaft in its self-starting position when the current is cut off, so that when the current is next applied the motor starts without manual presetting or other manipulation by the user. Preferably the brake incorporates balanced, opposed, fly weights which themselves, when the current is cut off, are spring-biased into engagement with suitable stop means, the organization being such that when the motor is running at normal operating speed the fly weights expand to such an extent as to clear the stop means, so that the weights then function solely as a fly wheel and impose no objectionable load on the motor.

In the illustrated preferred form of the invention, a fly weight support, in the form of a plate 12, is secured directly to the end of shaft 7 remote from the cam 9. The fly weights 13 in this instance are designed for sliding movement on plate 12 toward and from the shaft axis and comprise pieces of flat stock having their edges turned over, as indicated (Fig. 5) to embrace the edges of plate 12 and so guide the weights. The weights are further guided and at least their outward travel is limited by means of pins 14 which travel in slots 15. As will be observed, the inwardly facing, opposed surfaces or edges 16 of the weights project on each side of the shaft axis so as to provide extended "brake" or stop surfaces. The weights are united by springs 17 which are biased to draw the weights together but which are light enough to yield and permit the weights to move outwardly under centrifugal action when the motor is running.

The stop means with which the "brake" surfaces of the weights cooperate is shown as comprising two tabs 18 bent over from projecting fingers forming part of a plate 19 secured to posts 20 projecting from bridge piece 11. The tabs 18 are spaced apart on diametrically opposite sides of the axis of shaft 7, but at such a distance that when the motor is running at operating speed and the weights are at the outer limit of their travel, the weights clear the edges of the tabs. The parts are shown so positioned in Fig. 4.

From the foregoing it will be recognized that the brake structure serves, when the current is cut off, to arrest the shaft motion with the weights in full or flush engagement with the stop tabs as illustrated in Fig. 1. When no current is applied, the positioning of the shaft other than as in Fig. 1 causes the tabs 18 to spread the weights into an unstable condition from which they are returned, to the Fig 1 position, by their springs 17. It will also be recognized that in the unlikely event of the armature shaft actually coming to rest with the parts in the position shown in Fig. 4, a dead center position in which the springs are ineffective to collapse the weights, a slight twist given to the shaver, as in starting a watch, readily serves to move the weights slightly in relation to the stop tabs and permit the springs to restore the parts to their Fig. 1 position.

The assembly is such that in the Fig. 1 position of the brake elements, the armature shaft is in its self-starting position; that is to say, the contacts 10 are closed (Fig. 2) and the armature is so positioned as to be drawn into the field as soon as current is applied; and if it be assumed that the illustrated motor is designed to run in a clock-wise direction as viewed in Fig. 1, it will be apparent that it immediately starts up when the current is applied, the pull of the field serving to rotate the armature and give it a sufficient impulse to spread the weights and continue running. Alternatively, as will be understood, the setting may be such that the initial impulse imparted to the armature when the current is applied, tends to rotate it in the reverse direction from normal. In that event, the weights will be spread sufficiently to tension the springs 17 so that when the contacts 10 are separated by cam 9, the energy of the springs is applied to rotate the armature in the reverse or intended direction and with sufficient "spin" to initiate the normal running cycle.

In the light of the foregoing description of an illustrative embodiment of the principles of the invention, the following is claimed:

1. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises a centrifugal brake operatively associated with the said shaft, including fly weight means driven from the shaft and adapted to contract and expand into and out of braking position, respectively, and a stop located for engagement by the fly weight means when the shaft is at rest in its said self-starting position.

2. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises a centrifugal brake operatively associated with the said shaft, including fly weights driven from the shaft, a stop positioned for predetermined engagement by the fly weights when the shaft is at rest in its said self-starting position and stop means for limiting the outward centrifugal movement of the fly weights, said stop means located at such a distance from the axis of rotation of the fly weights as to permit the latter to clear the first-mentioned stop when the motor is running at operating speed.

3. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises fly weights secured to the shaft, spring means biasing the weights inwardly toward the shaft axis, the springs and weights being correlated to the motor speed to permit movement of the weights to an outer position under centrifugal action, and a fixed stop spaced from the axis of the shaft for engagement by the weights when the shaft is at rest and so positioned that the weights clear the stop in their said outer position, said stop being located, to position the stationary weights, and thereby the shaft, in its said predetermined self-starting position.

4. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises a support secured to the armature shaft, a pair of fly weights mounted on the support with freedom for radial movement relatively to the shaft, a shaft-positioning stop and spring means biasing the weights towards engagement with said stop.

5. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises a support secured to the armature shaft, and having outwardly directed slots on opposite sides of the shaft axis, opposed fly weights movably coupled to the support by pins engaging said slots, springs uniting the fly weights and biased to draw them inwardly toward the shaft axis, said weights having opposed, inwardly facing surfaces extending on each side of the shaft axis, and spaced stop means located on each side of the shaft axis for flush engagement by both said surfaces under the influence of said springs when the shaft is at rest in its said self-starting position.

6. In an impulse type motor having field poles, an armature, a shaft therefor and make and break contact mechanism actuated from the shaft, said mechanism being timed to provide for self-starting of the motor from a predetermined position of the shaft upon excitation of the field poles, the improvement which comprises a support secured to the armature shaft, a pair of fly weights mounted on the support with freedom for radial movement relatively to the shaft, a shaft positioning stop, having a stop surface extended diametrically with respect to and on opposite sides of the shaft axis and spring means biasing the weights towards full engagement with said extended stop surface when the shaft is in its said self-starting position.

GEORGE E. CANHAM.

No references cited.